(12) United States Patent
Hoffman et al.

(10) Patent No.: US 8,573,388 B2
(45) Date of Patent: Nov. 5, 2013

(54) CONVEYOR BELT TENSIONER FOR AN AGRICULTURAL HARVESTING HEADER

(75) Inventors: Daniel S. Hoffman, East Moline, IL (US); Cory Minnick, Hillsdale, IL (US); Krishna S. Potiuri, East Moline, IL (US); Christopher Krueger, Davenport, IA (US); Amy C. Berg, Milan, IL (US)

(73) Assignee: Deere & Company, Moline, IL (US)

( * ) Notice: Subject to any disclaimer, the term of this patent is extended or adjusted under 35 U.S.C. 154(b) by 84 days.

(21) Appl. No.: 13/285,404

(22) Filed: Oct. 31, 2011

(65) Prior Publication Data

US 2013/0105282 A1 May 2, 2013

(51) Int. Cl.
*A01D 57/20* (2006.01)
*B65G 23/44* (2006.01)

(52) U.S. Cl.
CPC .............. *A01D 57/20* (2013.01); *B65G 23/44* (2013.01)
USPC .............. 198/814; 198/816; 56/208; 56/14.5; 56/181; 56/187

(58) Field of Classification Search
USPC ........... 198/814, 816, 806; 56/14.5, 181, 187, 56/192, 208; 460/20, 70
See application file for complete search history.

(56) References Cited

U.S. PATENT DOCUMENTS

| | | | | |
|---|---|---|---|---|
| 2,631,421 A | * | 3/1953 | Pierce | 56/14.4 |
| 2,762,183 A | * | 9/1956 | Linscheid | 56/14.4 |
| 4,421,228 A | * | 12/1983 | Marsiglio et al. | 198/814 |
| 4,938,010 A | * | 7/1990 | Guinn et al. | 56/181 |
| 6,202,397 B1 | * | 3/2001 | Watts et al. | 56/208 |
| 7,805,921 B2 | * | 10/2010 | Coers et al. | 56/364 |
| 2007/0251203 A1 | * | 11/2007 | Coers et al. | 56/181 |
| 2008/0271426 A1 | * | 11/2008 | Lohrentz et al. | 56/153 |
| 2009/0249760 A1 | * | 10/2009 | Sauerwein et al. | 56/181 |
| 2009/0320431 A1 | * | 12/2009 | Puryk et al. | 56/181 |

* cited by examiner

*Primary Examiner* — Mark A Deuble

(57) ABSTRACT

A conveyor belt tensioning arrangement for an agricultural harvesting header (102), the agricultural harvesting header (102) with the conveyor belt tensioning arrangement, and an agricultural combine having the agricultural harvesting header (102) are described herein, the arrangement comprising a conveyor belt roller (208) supported on a roller carriage (228), the conveyor belt roller (208) being spring-loaded to maintain tension in the conveyor belt (108, 112), the conveyor belt roller (208) also being supported to pivot about an axis generally perpendicular to the longitudinal extent of the conveyor belt roller (208).

8 Claims, 7 Drawing Sheets

CONVEYOR BELT TENSIONER FOR AN AGRICULTURAL HARVESTING HEADER

FIELD OF THE INVENTION

The present invention relates to agricultural harvesting heads. More particularly it relates to conveyor belt tensioners for agricultural harvesting headers.

BACKGROUND OF THE INVENTION

An agricultural harvesting machine such as a combine includes a harvesting header and a feeder housing or crop elevator which removes the crop material from the field, gather the crop material and transport the crop material to a threshing separating and cleaning mechanism located in the combine.

The cleaned grain is deposited in a grain tank located at the top of the combine. When the grain tank becomes full, an unloading auger, which is supported on and positioned alongside of the combine during harvesting, is moved to its unloading position in which the auger extends approximately perpendicular to the longitudinal axis of the combine. A vehicle drives alongside the combine into which the grain is to be unloaded, such as a semi-trailer, and the unloading auger is actuated to discharge the grain into the vehicle.

For small stemmed crops such as wheat, soybeans, etc., the combine typically carries and drives a header with a reciprocating knife at the leading edge of the header. The particular header illustrated herein is a draper header, although the invention is not limited to a draper header. The reciprocating knife is alternatively called a sickle, sickle bar, cutter bar or similar terms. The crop is cut using the reciprocating knife and falls forward onto laterally extending conveyor belts that carry the crop to a central aperture of the header. The cut crop passes through the aperture and into the feeder house.

To insure the belts can be driven, they must be properly tensioned on their respective idler rollers and drive rollers. Sufficient tension must be maintained across the width of the drive rollers that they can transfer sufficient power to the belt to carry the crop inward toward the feederhouse. In modern designs, the conveyor belts and cutter bar are supported on arms that extend forward from the frame of the header. As these arms travel over the ground, they lift up and down with respect to each other, flexing and twisting the cutter bar and the conveyor belts as they follow the contours of the ground.

In U.S. Pat. No. 6,202,397 B1, a tensioning apparatus is illustrated for a center draper belt conveyor in which a translatable end roller is supported on two sliding roller mounts extending from a conveyor frame. A bell crank mounted on a stationary from extending across the middle of the conveyor permits a spring force to be applied to the roller, wherein the spring extends generally parallel to the rollers. The force is applied to the roller carriage at its midpoint to provide an even pressure across the width of the belt. This belt is fixed to a frame and cannot twist.

In U.S. Pat. No. 2,631,421, a windrow harvester attachment for a tractor has a laterally extending conveyor belt that is tensioned by extending opposed pairs of links located at each end of the adjustable drive roller. The links are fixed to a stationary front rail and a stationary rear rail. The geometry (see FIG. 4) is such that a constant tension is applied across the width of the belt.

In U.S. Pat. No. 2,762,183, a windrow harvester is shown with an end roller supported on two nested, telescopic cylinders supporting opposing ends of the end roller with a spring disposed in each cylinder and with the telescopic cylinders mounted to a stationary front rail and a stationary rear rail. These identical telescoping supports apply a similar force to both ends of the rollers, thereby providing a constant tension across the width of the belt. The endmost roller is not supported to pivot or twist, nor is the conveyor itself supported to pivot or twist.

Accommodating the flexing and twisting of the conveyor belts is difficult using traditional belt tensioners. The rollers must be able to push outward against the belt and also pivot side to side to distribute the tension across the belt. If the tension in the conveyor belt cannot be distributed across its width, the belt may break, may slip, or may suffer premature wear.

It is an object of this invention to provide a header with a belt tensioner that accommodates the flexing and twisting of the conveyor belts and distributes the tension more evenly across the width of the conveyor belts than these prior art arrangements.

SUMMARY OF THE INVENTION

In accordance with one aspect of the invention, a conveyor belt tensioning arrangement for an agricultural harvesting header is provided, said agricultural harvesting header having a frame, a plurality of arms pivotally coupled to the frame to pivot up and down at their forward ends with regard to said frame and extending forward from said frame, and a conveyor belt disposed on said plurality of arms to carry cut crop material, the tensioning arrangement including a roller having a front end and a rear end and a central axis, wherein the conveyor belt is wrapped around the roller for approximately 180 degrees to form an end loop in said conveyor belt; an elongate roller carriage having a front end and a rear end, said elongate roller carriage being configured to support the roller for rotation about the central axis, wherein the elongate roller carriage has front carriage guide at the front end and a rear carriage guide at the rear end; front and rear guide members fixed with respect to an endmost pivoting arm of said plurality of pivoting arms, wherein the front guide member supports the front carriage guide and the rear guide member supports the rear carriage guide, wherein the front and rear guide members constrain the elongate roller carriage to translate with respect to the frame in a direction generally parallel to a direction of travel of the belt; an elongate tensioning beam, the tensioning beam having a front end and a rear end, wherein a central portion of the tensioning beam is coupled to a central portion of the elongate roller carriage to apply pressure to the elongate roller carriage; and a spring assembly fixed to the endmost pivoting arm, said spring assembly having a spring disposed to apply pressure to the rear end of the tensioning beam; wherein the elongate roller carriage defines an aperture, and further wherein a pin coupled to the elongate tensioning beam is disposed in the aperture to apply pressure to a surface of the slot.

The aperture may be a slot. The slot may be generally parallel to the longitudinal axis of the roller. The slot may be disposed closer to the rear end of the tensioning beam than the front end of the tensioning beam. The tensioning beam may have a plurality of working positions in which it can apply tension to the conveyor belt and further in which the roller has a plurality of corresponding positions along said slot. The tensioning beam may be concave in a direction facing away from the elongate roller carriage. The front end of the tensioning beam may be pivotally coupled to the front guide member.

In accordance with another aspect of the invention, an agricultural harvesting header having a conveyor belt tensioning arrangement is provided, the agricultural harvesting header including a frame, a plurality of arms pivotally coupled to the frame at the rear ends to pivot up and down at their forward ends with regard to said frame and extending forward from said frame; a conveyor belt disposed on said plurality of arms to carry cut crop material; a first roller supporting a first end loop of the conveyor belt for reversing the direction of said conveyor belt, said first roller being supported on a first one of said plurality of arms; and a tensioning arrangement, wherein the tensioning arrangement further includes: a second roller having a front end and a rear end and a central axis, wherein the conveyor belt is wrapped around the second roller for approximately 180 degrees to form a second end loop of the conveyor belt; an elongate roller carriage having a front end and a rear end, said elongate roller carriage being configured to support the second roller for rotation about the central axis, wherein the elongate roller carriage has front carriage guide at the front end and a rear carriage guide at the rear end; front and rear guide members fixed with respect to an endmost pivoting arm of said plurality of pivoting arms, wherein the front guide member supports the front carriage guide and the rear guide member supports the rear carriage guide, wherein the front and rear guide members constrain the elongate roller carriage to translate with respect to the frame in a direction generally parallel to a direction of travel of the belt; an elongate tensioning beam, the tensioning beam having a front end and a rear end, wherein a central portion of the tensioning beam is coupled to a central portion of the elongate roller carriage to apply pressure to the elongate roller carriage; and a spring assembly fixed to the endmost pivoting arm, said spring assembly having a spring disposed to apply pressure to the rear end of the tensioning beam; wherein the elongate roller carriage defines an aperture, and further wherein a pin coupled to the elongate tensioning beam is disposed in the aperture to apply pressure to a surface of the aperture.

In accordance with yet another aspect of the invention, a conveyor belt tensioning arrangement for an agricultural harvesting header is provided, the agricultural harvesting header having a frame, a plurality of arms pivotally coupled to the frame to pivot up and down at their forward ends with regard to said frame and extending forward from said frame, and a conveyor belt disposed on said plurality of arms to carry cut crop material, the tensioning arrangement including a first roller mounted on a first one of said plurality of arms that is disposed to support a first end of the conveyor belt; a second roller mounted on an second arm of the plurality of floating arms to support a second end of the conveyor belt, wherein said second roller is supported on said second arm to translate in a direction generally parallel to a direction of travel of the conveyor belt and wherein said second roller pivots on said second arm about an axis generally perpendicular to the longitudinal extent of the second roller and perpendicular to a planar upper surface of the conveyor belt; and a spring coupled to the second roller to apply a larger spring force to a rear end of the second roller than to a front end of the second roller, wherein the larger and smaller spring forces are applied to the second roller in a direction facing away from the first roller.

In accordance with an even further aspect of the invention, a conveyor belt tensioning arrangement for an agricultural header comprises a spring loaded roller for the conveyor belt that is mounted to pivot about an axis generally perpendicular to the upper surface of the conveyor belt. This arrangement permits the tension across the width of the roller to be more evenly distributed. This is particularly beneficial when the rollers are supported on arms with front ends that pivot up and down with respect to the frame of agricultural header and thereby cause the conveyor belt to twist.

DETAILED DESCRIPTION OF THE INVENTION

In the discussions below, the terms "fore", "front", "forward", "in front of", and the like, refer to the direction the agricultural combine and harvesting head are pointing as they travels through the field harvesting crops. The terms "aft", "rear", "rearward", "behind" "to the rear of" and the like refer to the direction opposite to the forward direction of travel. The terms "lateral", "laterally", "transverse", "transversely", "side-to-side" and the like refer to a direction that is generally horizontal and normal to the direction of travel of the vehicle.

Figure 1:
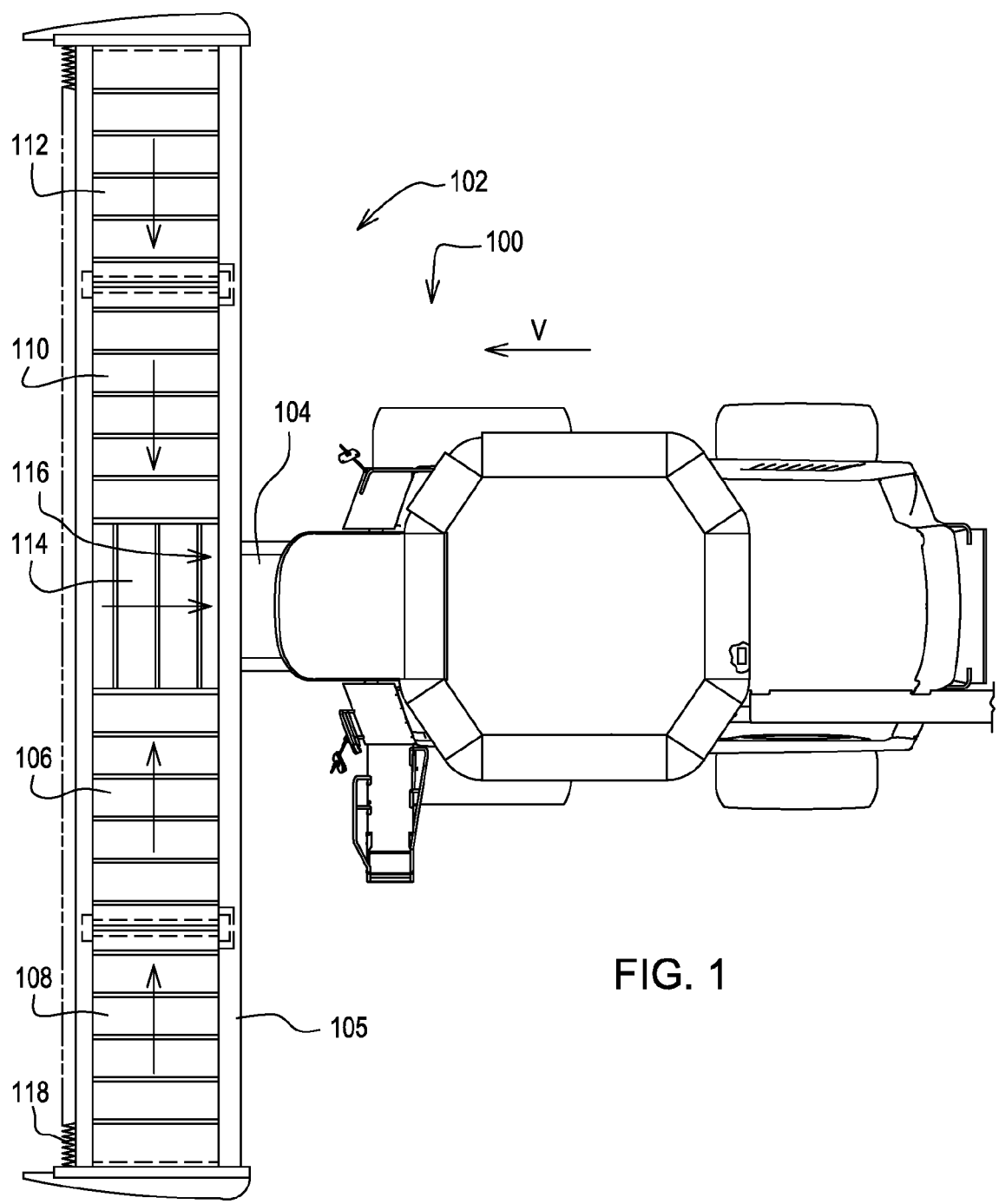
FIG. 1 is a plan view of a combine with a header attached thereto.

Referring now to the drawings, and more particularly to FIG. 1, there is shown a portion of an agricultural harvesting machine in the form of a combine 100 which is coupled to an agricultural harvesting header, here shown as a draper header 102. Draper header 102 is supported on a feederhouse 104 of the combine.

Draper header 102 has a frame 105 that supports the inner left side and outer left side conveyors including conveyor belts 106, 108 and the inner right side and outer right side conveyors including conveyor belts 110, 112.

The conveyor belts on each side are disposed end-to-end to form a continuous planar crop-carrying upper surface that travels inwardly toward the center of the draper header (as indicated by the arrows superimposed on the belts), generally perpendicular to the direction of travel of the combine and header through the field, said direction of travel being indicated by the arrow "V" in FIG. 1.

A center conveyor includes a conveyor belt 114 on two laterally extending rollers. Conveyor belt 114 receives the cut crop material from conveyor belts 106 and 110 and carries the cut crop material rearward through aperture 116 and into the feederhouse 104 and combine 100.

Figure 2:
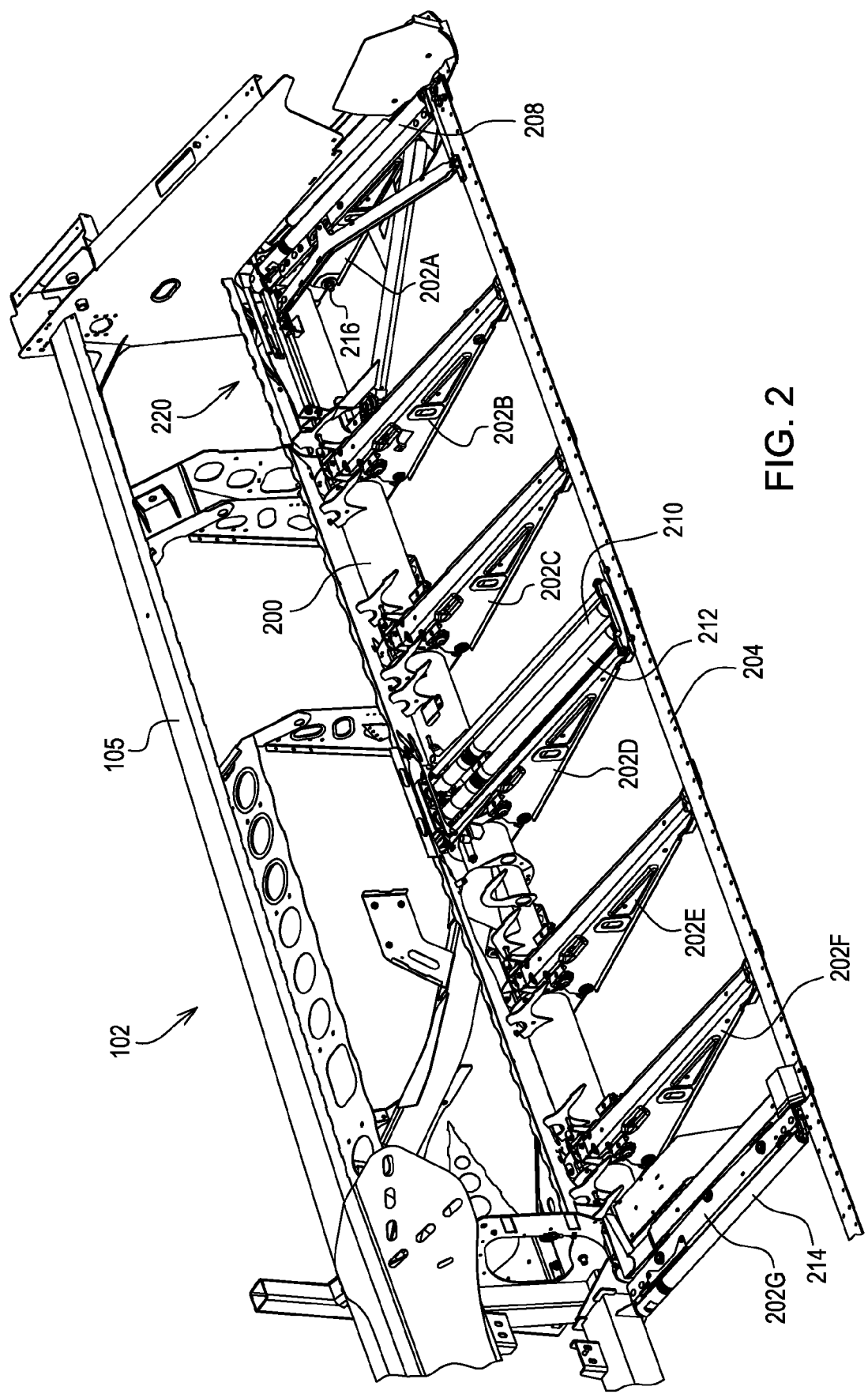
FIG. 2 is front-right perspective view of the left side of the header with the rear sheets, conveyor belts, and reciprocating knife removed.

The conveyor belts 106, 108, 110, 112, are supported for recirculating movement on rollers that are shown in greater detail in FIG. 2.

A reciprocating knife 118 extends across substantially the entire width of the header 102 immediately in front of the conveyor belts and generally at the same height. The knife 118 is disposed at the front of the header 102 at ground level. The knife 118 is configured to sever the stalks of the crop plants as they reach the header 102, permitting the cut crop plants to fall rearward onto the conveyor belts 106, 108, 110, 112, 114.

Referring to FIG. 2, the arrangement of the left side conveyors is shown with the conveyor belts and rear sheet removed for ease of illustration and explanation. Frame 105 includes a laterally extending elongate tubular member 200 that is disposed at the bottom rear of the draper header 102. Several pivoting arms 202 are supported on and extend generally forward from tubular member 200. Arms 202 are spaced apart one from another and extend across the width of tubular member 200. The leading ends of arms 202 are fixed to and support an elongate bar 204 of reciprocating knife 118. The elongate bar 204 is flexible and moves up and down when the arms 202 pivot up and down with respect to member 200. The elongate bar 204 is sufficiently flexible to permit adjacent arms 202 to move up and down at their forward ends independent of each other. The bar 204 in turn supports conventional reciprocating guards and guides that in turn support and guide an elongate reciprocating member on which a row of cutting blades are bolted. The elongate reciprocating knife member flexes together with the elongate bar 204 to permit the arms 202 to flex up and down independently of each other.

The conveyor belts 106, 108, 110, 112 are supported on several idler and drive rollers that in turn are supported on several of the arms 202. These rollers pivot up and down together with the arms 202 on which they are mounted. These rollers support the loops at the ends of conveyor belts and keep the proper tension in the conveyor belts. The rollers permit the conveyor belts to pivot up and down and twist as the underlying arms move up and down with respect to each other.

The outermost arm 202A of the outer left side conveyor supports the outer end of the conveyor belt 108 on outermost roller 208. When the conveyor belt is driven, the upper web of the conveyor belt 108 travels inwardly toward the central portion of the draper header 102, passes over the top surface of arms 202B and 202C and wraps around roller 210. The lower or return web of the conveyor belt 108 travels back to roller 208 from roller 210 to complete the circuit. On its return path, the lower web of the conveyor belt 108 passes under the upper web of the conveyor belt 108 and above the top surface of the arms 202B and 202C as it returns to roller 210, where it joins the upper web.

The conveyor belt 106 of the inner left side conveyor follows a similar path travelling between rollers 212 and 214 and passing over the upper surfaces of arms 202D, 202E, 202F, 202G.

Figure 3:
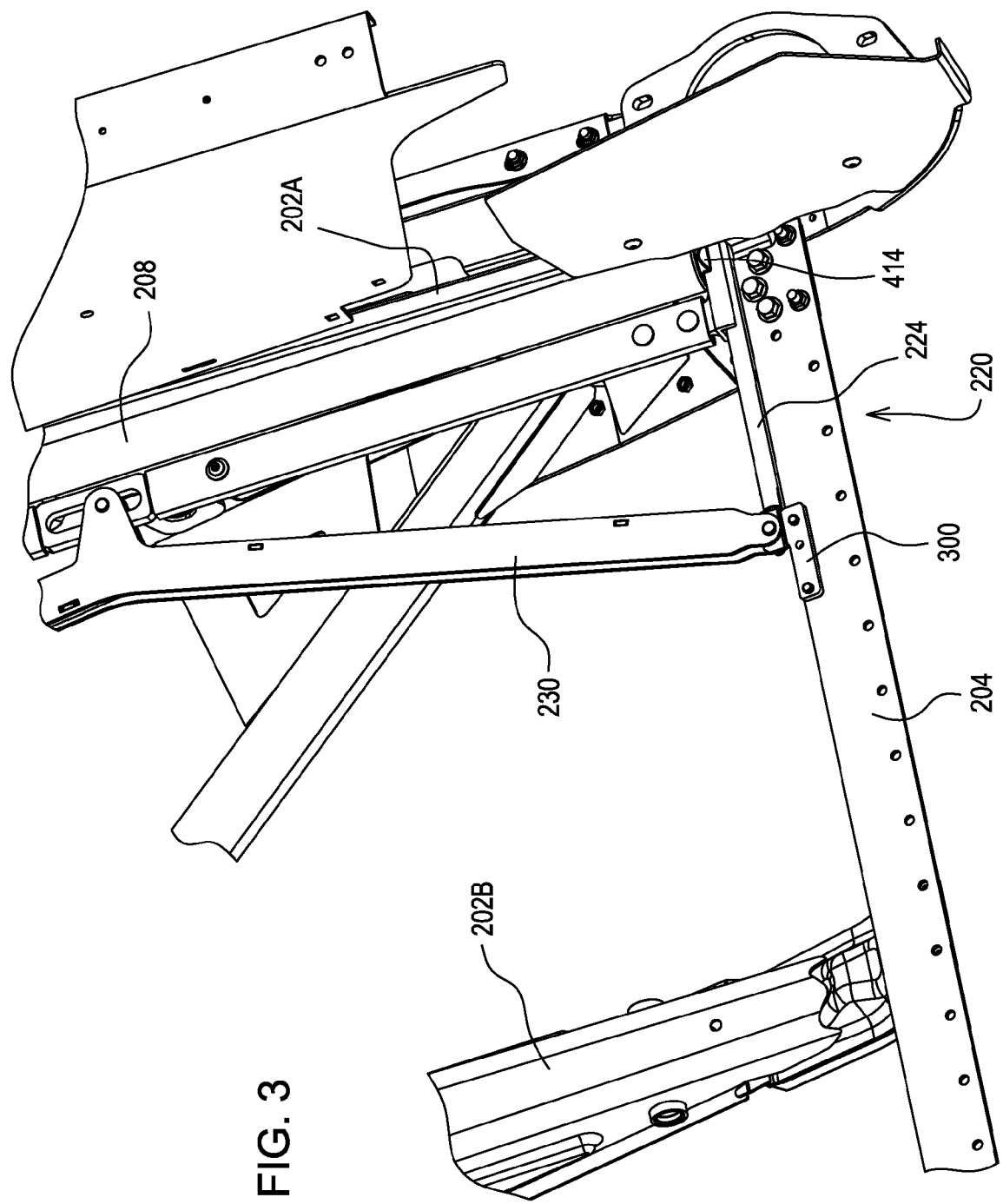
FIG. 3 is a detail front-right perspective view of the forward portion of the left side belt tensioner and cutter bar.
Figure 4:
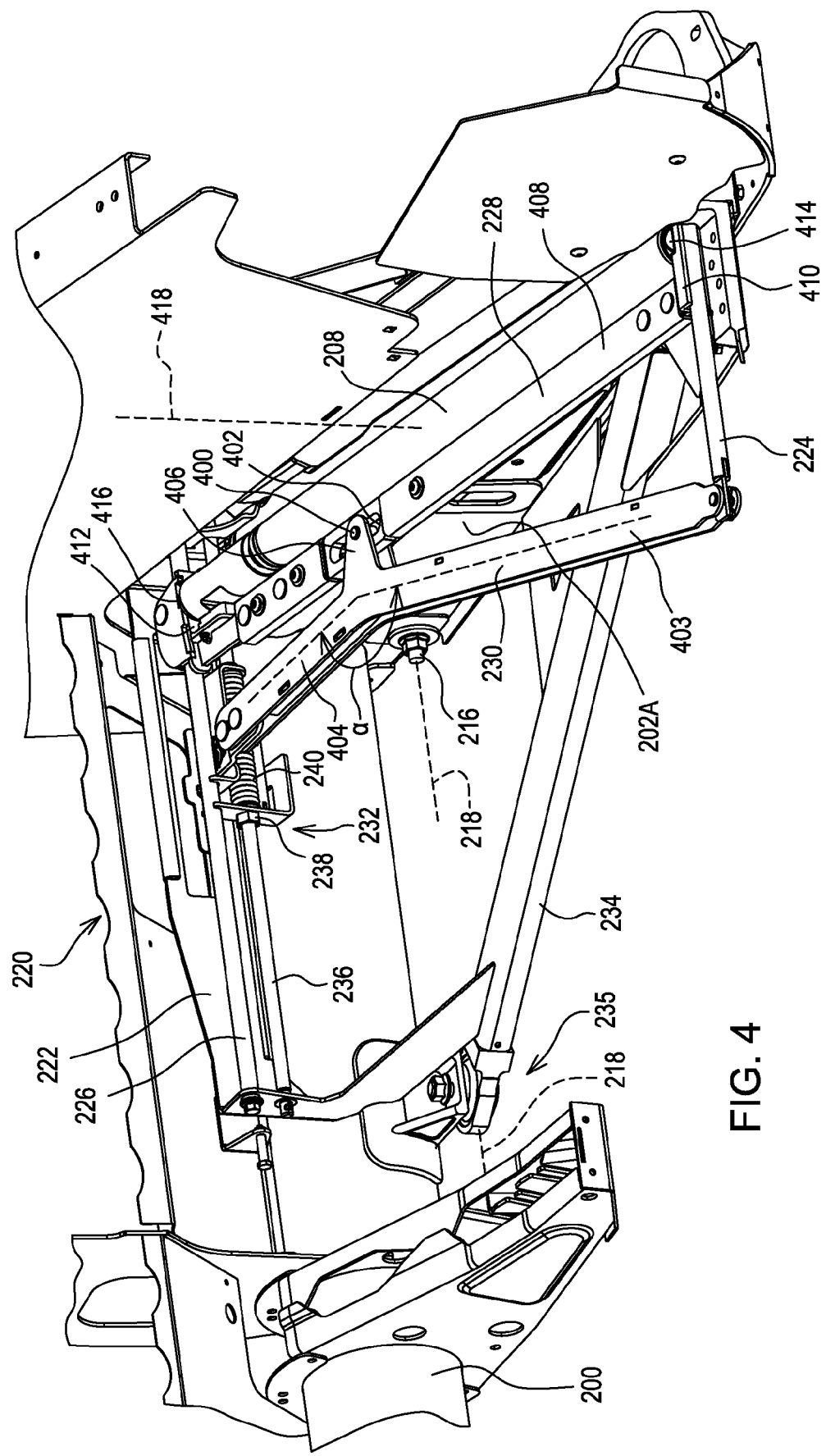
FIG. 4 is a detail front-right perspective view of the left side belt tensioner with the reciprocating portions of the knife, the belt and arm 202A removed.

Referring to FIGS. 2-4, the arm 202A and the other arms are mounted on the tubular member 200, each on its own coaxial pivot pin, such as pivot pin 216 that mounts arm 202A for pivoting on tubular member 200. These pivot pins define a horizontal pivot axis 218 that extends transverse to the direction of travel V" and parallel to the longitudinal extent of tubular member 200. A roller mount 220 is fixed to the arm 202A which in turn supports outermost roller 208 mounted thereon. Roller mount 220 tensions the conveyor belt 108 by applying force to outermost roller 208, which in turn presses outwardly against the outer end of the conveyor belt 108 to tension the conveyor belt 108 thereby keeping the conveyor belt 108 under sufficient tension to maintain its proper position on rollers 208, 210.

Roller mount 220 includes a bracket 222, a front guide member (here shown as a front guide rod 224), a rear guide member (here shown as a rear guide rod 226), a translating roller carriage 228, a tensioning beam 230, and a spring assembly 232.

The arm 202A includes a strut 234 that is fixed to the forward end of the arm 202A and extends rearward and inward, terminating in a ball joint 235 that is coupled to a ball joint mount welded to tubular member 200. The center of the ball of the ball joint 235 lies on pivot axis 218. The diagonally extending strut 234 reduces the torsional loads on the pivot pin 216 and the arm 202A that would otherwise be applied to the arm 202A by the belt 108 when it is tensioned. The strut pivots with the arm 202A.

Bracket 222 is welded to this strut to also pivot with the arm 202A. The inner end of rear guide rod 226 is fixed to the bracket 222.

Figure 7:
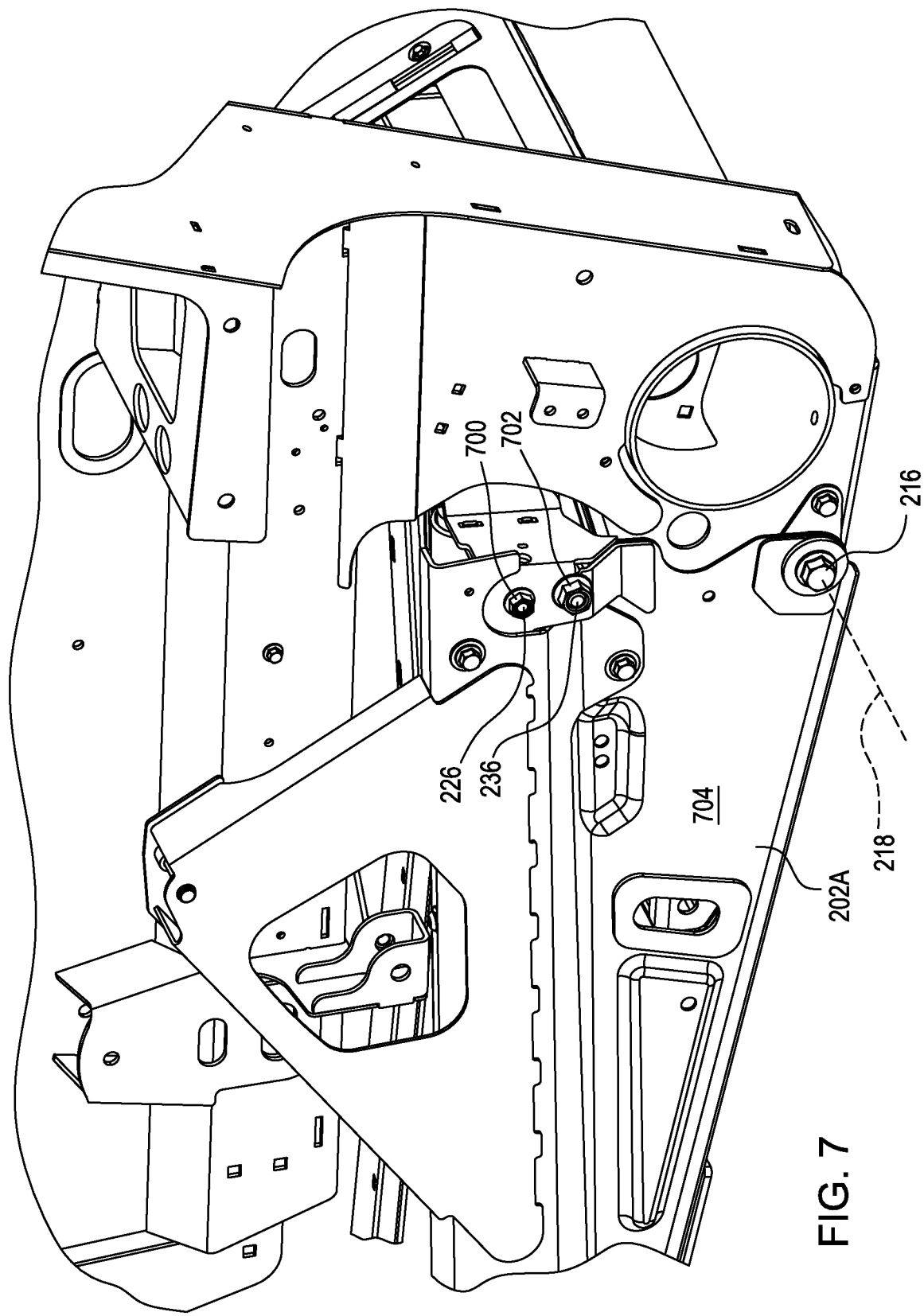
FIG. 7 is a rear-left perspective view of the left end of the header showing the belt tensioner.

The outer end of rear guide rod 226 is bolted to arm 202A (FIG. 7) with a threaded fastener 700 (FIG. 7). Thus the rear guide rod 226 moves together with the bracket 222 and the arm 202A when arm 202A pivots about axis 218 with respect to tubular member 200.

Figure 6:
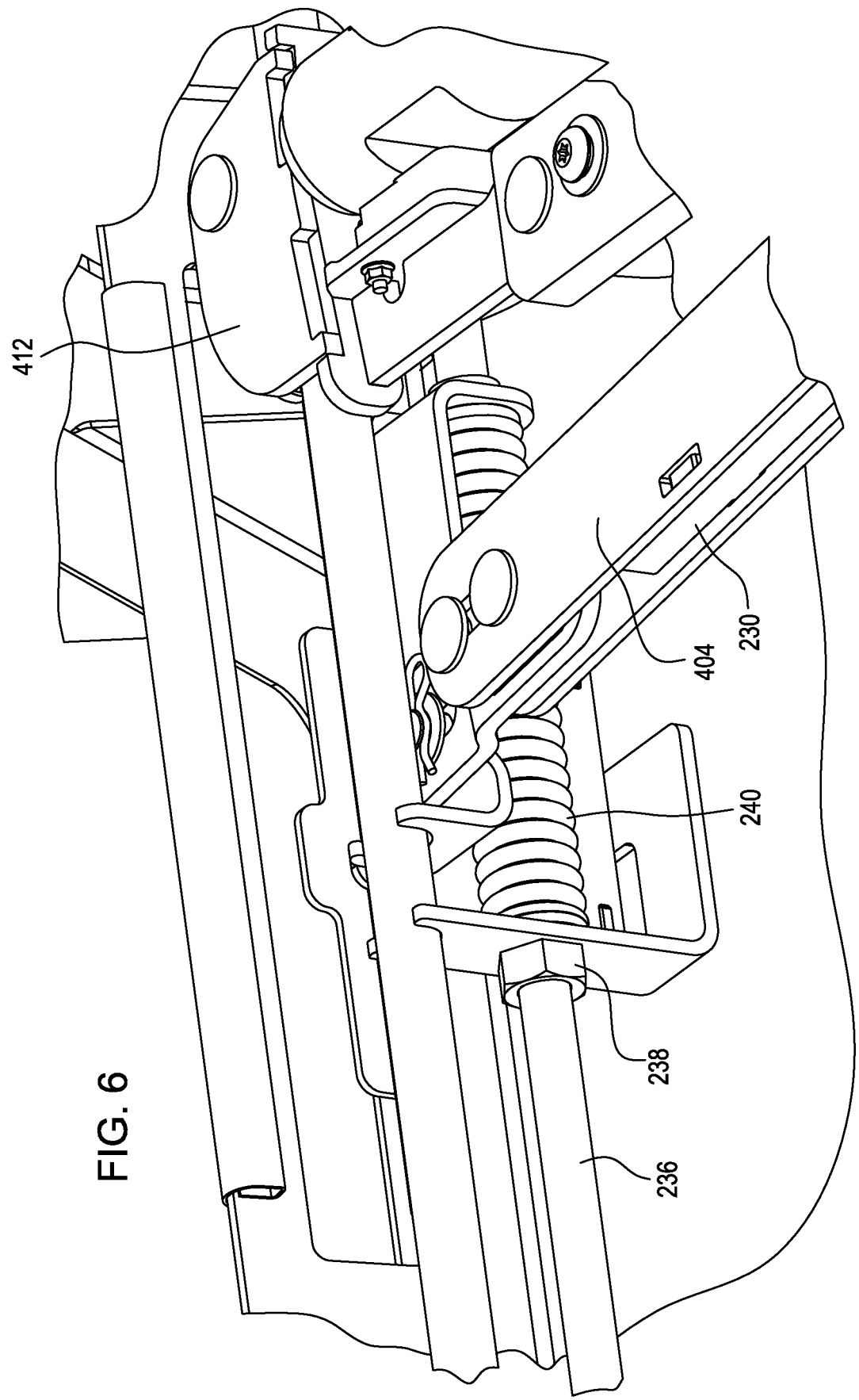
FIG. 6 is a detail front-right perspective view of the rear portion of the left side belt tensioner.

Referring to FIGS. 4 and 6, spring assembly 232 comprises an elongate spring support 236, a spring retainer 238 that is threaded on the spring support 236, and a coil spring 240 coiled around the spring support 236.

The elongate spring support 236 is formed as a threaded rod with a head 702 (FIG. 7) at its outer end. The tension in the coil spring 240 is communicated to the head 702 which abuts the outer side wall 704 (FIG. 7) of arm 202A at a point adjacent to the pivot pin 216. This arrangement communicates the tension in the coil spring 240 to the arm 202A itself.

The tension in coil spring 240 can be adjusted by placing a wrench on head 702 and rotating it. This rotation causes the spring retainer 238 to threadedly move up and down along the length of the elongate spring support 236, and thus causes the inner end of coil spring 240 to move up and down along the length of the elongate spring support 236.

The outer end of coil spring 240 abuts the rear end of tensioning beam 230. Tensioning beam 230 extends generally fore-and-aft and is disposed inside the loop of the conveyor belt 108. Tensioning beam 230 serves to communicate the tension in coil spring 240 to the translating roller carriage 228. The rear end of tensioning beam 230 is slidably supported on the elongate spring support 236 resting against the outer end of coil spring 240. Thus, any tension in spring 240 is applied to the rear end of tensioning beam 230 and tends to push it outward.

Figure 5:
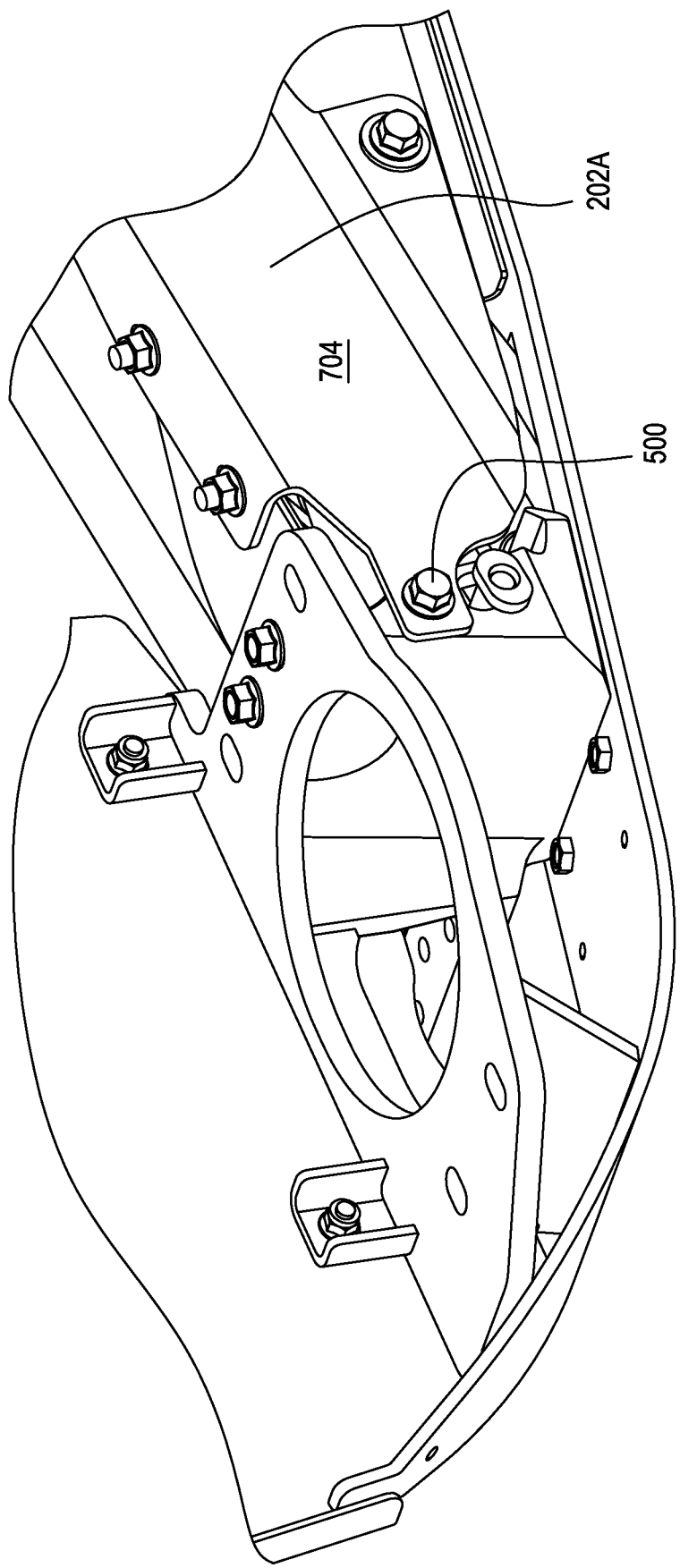
FIG. 5 is a front-left perspective view of the left end of the header.

The front end of tensioning beam 230 is coupled to the front guide rod 224 and elongate bar 204 which restrains the front end of tensioning beam 230 and communicates the tension in the tensioning beam 230 directly to the arm 202A. The front guide rod 224 passes through a hole in the arm 202A and has a head 500 (FIG. 5) at its outer end that rests against the outer side wall 704 (FIG. 5) of the arm 202A and the elongate bar 204.

The inner end of front guide rod 224 is coupled to a bracket 300 (FIG. 3) that is attached to the elongate bar 204 with bolts (not shown). The elongate bar 204 supports the reciprocating elements of the sickle bar. This arrangement communicates the pressure applied to the tensioning beam to the elongate bar 204 which in turn is coupled to the forward ends of the arms 202, and communicates it in particular to the front ends of the arms 202A and 202B. The arms 202A and 202B are fixed to the elongate bar 204 on either side of the bracket 300. The front guide rod 224 is therefore connected at its outer end to the arms 202A and at its inner end to the elongate bar 204.

The front guide rod 224 and the rear guide rod 226 extend laterally, parallel to the direction of travel of the conveyor belt 108 and perpendicular to the direction of travel "V" of the draper header 102. Both the front guide rod 224 and the rear guide rod 226 are disposed such that they are parallel with each other and intersect the rotational axis of the outermost roller 208.

A central region of the tensioning beam 230 is coupled to the translating roller carriage 228. The mating components are a pin 400 on the tensioning beam and an aperture, which is shown herein in its preferred form as a slot 402 on the translating roller carriage which receives the pin.

The slot 402 is preferably straight and extends generally parallel to the length of the outermost roller 208. This arrangement permits the tensioning beam 230 to apply a force against the translating roller carriage 228 that is parallel to the forces applied by the tensioning beam 230 to front guide rod 224 and spring support 236. This reduces fore-and-aft loading of the front guide rod 224 and spring support 236, thereby reducing or eliminating any fore-and-aft bending.

The tensioning beam 230 is swept back away from the translating roller carriage 228 on each end, having a front beam section 403 that is fixed to a rear beam section 404. The front beam section 403 and the rear beam section 404 are at a lesser included angle ($\alpha$) of less than 180 degrees with respect to each other with the angle alpha facing inwardly, away from the translating roller carriage 228 such that their distal ends are located farther from the translating roller carriage 228 than the central region of the tensioning beam 230. This permits some pivoting of the tensioning beam 230 with respect to the translating roller carriage about the pin 400.

The pin 400 is disposed at the junction of the front beam section 403 and the rear beam section 404. The pin 400 is supported on a pivot mount 406 of the tensioning beam 230. The pivot mount 406 is located at the junction of the front beam section 403 and the rear beam section 404. The pivot mount 406 extends toward the translating roller carriage 228 from the junction of the front beam section 403 and the rear beam section 404 providing additional clearance between the tensioning beam 230 and the translating roller carriage 228. This permits the tensioning beam 230 to pivot about its front end to a greater extent and thereby to move the translating roller carriage 228 farther toward the middle of the draper platform when the spring retainer 238 translates inwardly and away from arm 202A on the elongate spring support 236.

Translating roller carriage 228 comprises an elongate beam 408, a front carriage guide 410, a rear carriage guide 412, a front roller mount 414, and a rear roller mount 416.

The elongate beam 408 extends from the front guide rod 224 to the rear guide rod 226. Slot 402 is formed in elongate beam 408 and extends generally parallel to the longitudinal extent of outermost roller 208. Elongate beam is coupled to front carriage guide 410 and rear carriage guide 412.

The front carriage guide 410 is generally C-shaped (open at the front) and is slidably supported on front guide rod 224 to translate back and forth with respect to front guide rod 224 as tension is applied to and is released from the conveyor belt 108.

The front carriage guide 410 is slidably supported on front guide rod 224 and thereby supports the front of the translating roller carriage in a predetermined vertical position with respect to the elongate bar 204 and the front of arm 202A. It permits the translating roller carriage to translate side to side in a direction parallel to the direction of movement of the conveyor belt 108 to permit the tensioning beam 230 to maintain the front portion of the conveyor belt 108 at a desired predetermined pressure.

The rear carriage guide 412 is generally C-shaped (open at the rear) and is slidably supported on rear guide rod 226 to translate back and forth with respect to rear guide rod 226 as tension is applied to and is released from the conveyor belt 108.

The rear carriage guide 412 is slidably supported on rear guide rod 226 and thereby supports the rear of the translating roller carriage in a predetermined vertical position with respect to the rear of arm 202A. It permits the translating roller carriage to translate side to side in a direction parallel to the inward direction of travel of the conveyor belt 108 to permit the tensioning beam 230 to maintain the rear portion of the conveyor belt 108 at a desired predetermined pressure.

The front roller mount 414 is fixed to the front carriage guide 410 and supports the front end of the outermost roller 208 for free rotation about the central axis of the outermost roller 208.

The rear roller mount 416 is fixed to the rear carriage guide 412 and supports the rear end of outermost roller 208 for free rotation about the central axis of the outermost roller 208.

The front carriage guide 410 and the rear carriage guide 412 are provided with sufficient clearance such that the front end of the translating roller carriage 228 and rear end of the translating roller carriage 228 can translate independently of each other. This permits a slight rotation of the translating roller carriage (and hence a slight translation of the outermost roller 208) about an axis 418 that is perpendicular to the rotational axis of the outermost roller 208, that axis 418 also being perpendicular to the plane of the upper surface of the conveyor belt 108 adjacent to roller 208.

This slight play permits the roller to twist slightly about the axis 418 as the arms 202 pivot up and down. When the arms 202 are pivoted up and down in different directions with respect to each other, it causes the leading edge of the conveyor belt 108 to have a similar up-and-down shape. The rear (or trailing) edge of the conveyor belt 108 does not have the same up-and-down shape since the trailing edge of the conveyor is closer to the pivot axis of the arms 202.

As a result, the tension along the front edge of the conveyor belt 108 increases significantly more than the belt tension along the rear edge of the conveyor belt 108. To release this tension on the front of the belt 108 yet maintain the relatively unchanged tension on the rear of the belt 108, the front end of the roller 208 must be permitted to translate inwardly (i.e. toward the other roller 210 which supports the other end of conveyor belt 108) more than the rear of the conveyor belt. This reduction of tension at the front end of the roller but not at the rear end is provided by allowing the roller 208 to pivot slightly about axis 418 as the belt flexes up and down more in the front than in the rear. The pivoting of the roller about 418 equalizes the tension in the front of the belt and the tension in the rear of the belt.

The above description explains the arrangement of elements on the left side of the draper platform. The right side of the draper platform is constructed identically to the left side of the draper platform but in mirror image relation. Thus, the description above applies equally to the right side of the draper platform.

Having described the preferred embodiments, it will become apparent that various modifications can be made without departing from the scope of the invention as defined in the accompanying claims.

The invention claimed is:

1. A conveyor belt tensioning arrangement for an agricultural harvesting header (102), said agricultural harvesting header (102) comprising a frame (105), a plurality of arms (202) pivotally coupled to the frame (105) to pivot up and down at their forward ends with regard to said frame (105) and extending forward from said frame (105), and a conveyor belt (108, 112) disposed on said plurality of arms (202) to carry cut crop material, the tensioning arrangement comprising:

a roller (208) comprising a front end and a rear end and a central axis, wherein the conveyor belt (108, 112) is wrapped around the roller (208) for approximately 180 degrees to form an end loop in said conveyor belt (108, 112);

an elongate roller carriage (228) comprising a front end and a rear end, said elongate roller carriage (228) being configured to support the roller (208) for rotation about the central axis, wherein the elongate roller carriage (228) comprises a front carriage guide (410) at the front end and a rear carriage guide (412) at the rear end;

front and rear guide members (224, 226) fixed with respect to an endmost pivoting arm (202A) of said plurality of arms (202), wherein the front guide member (224) supports the front carriage guide (410) and the rear guide member (226) supports the rear carriage guide (412), wherein the front and rear guide members (224, 226) constrain the elongate roller carriage (228) to translate with respect to the frame (105) in a direction generally parallel to a direction of travel of the belt (108, 112);

an elongate tensioning beam (230), the tensioning beam (230) comprising a front end and a rear end, wherein a central portion of the tensioning beam (230) is coupled to a central portion of the elongate roller carriage (228) to apply pressure to the elongate roller carriage (228); and a spring assembly (232) fixed to the endmost pivoting arm (202A), said spring assembly (232) comprising a spring (240) disposed to apply pressure to the rear end of the tensioning beam (230);

wherein the elongate roller carriage (228) defines an aperture (402), and further wherein a pin coupled to the elongate tensioning beam (230) is disposed in the aperture (402) to apply pressure to a surface of the aperture (402).

2. The conveyor belt tensioning arrangement of claim 1, wherein the aperture (402) is a slot.

3. The conveyor belt tensioning arrangement of claim 2, wherein the slot (402) extends generally parallel to the longitudinal axis of the roller (208).

4. The conveyor belt tensioning arrangement of claim 1, wherein the aperture (402) is disposed closer to the rear end of the tensioning beam (230) than the front end of the tensioning beam (230).

5. The conveyor belt tensioning arrangement of claim 2, wherein the tensioning beam (230) has a plurality of working positions in which it can apply tension to the conveyor belt (108, 112) and further in which the roller (208) has a plurality of corresponding positions along said slot.

6. The conveyor belt tensioning arrangement of claim 1, wherein the tensioning beam (230) is concave in a direction facing away from the elongate roller carriage (228).

7. The conveyor belt tensioning arrangement of claim 1, wherein the front end of the tensioning beam (230) is pivotally coupled to the front guide member (224).

8. An agricultural harvesting header (102) comprising a conveyor belt tensioning arrangement, said agricultural harvesting header (102) comprising:

a frame (105);

a plurality of arms (202) pivotally coupled to the frame (105) at the rear ends to pivot up and down at their forward ends with regard to said frame (105) and extending forward from said frame (105);

a conveyor belt (108, 112) disposed on said plurality of arms (202) to carry cut crop material;

a first roller (210) supporting a first end loop of the conveyor belt (108, 112) for reversing the direction of said conveyor belt (108, 112), said first roller (210) being supported on a first one of said plurality of arms (202); and the tensioning arrangement further comprising:

a second roller (208) comprising a front end and a rear end and a central axis, wherein the conveyor belt (108, 112) is wrapped around the second roller (208) for approximately 180 degrees to form a second end loop of the conveyor belt (108, 112);

an elongate roller carriage (228) comprising a front end and a rear end, said elongate roller carriage (228) being configured to support the second roller (208) for rotation about the central axis, wherein the elongate roller carriage (228) has front carriage guide (410) at the front end and a rear carriage guide (412) at the rear end;

front and rear guide members (224, 226) fixed with respect to an endmost pivoting arm (202A) of said plurality of arms (202), wherein the front guide member (224) supports the front carriage guide (410) and the rear guide member (226) supports the rear carriage guide (412), wherein the front and rear guide members (224, 226) constrain the elongate roller carriage (228) to translate with respect to the frame (105) in a direction generally parallel to a direction of travel of the belt (108, 112);

an elongate tensioning beam (230), the tensioning beam (230) comprising a front end and a rear end, wherein a central portion of the tensioning beam (230) is coupled to a central portion of the elongate roller carriage (228) to apply pressure to the elongate roller carriage (228); and a spring assembly (232) fixed to the endmost pivoting arm (202A), said spring assembly (232) comprising a spring (240) disposed to apply pressure to the rear end of the tensioning beam (230);

wherein the elongate roller carriage (228) defines an aperture (402), and further wherein a pin coupled to the elongate tensioning beam (230) is disposed in the aperture (402) to apply pressure to a surface of the aperture (402).

* * * * *